Patented Mar. 20, 1928.

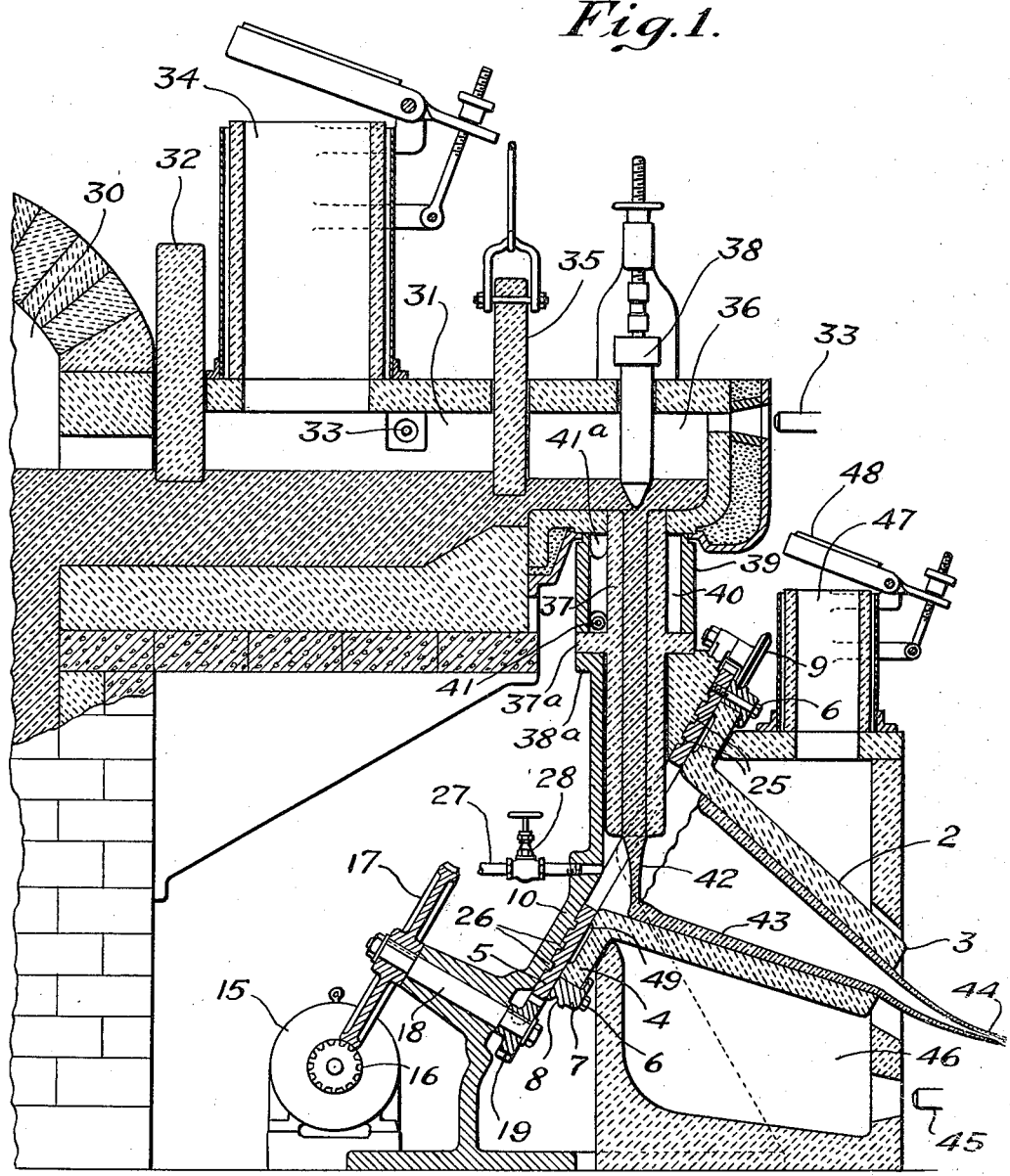

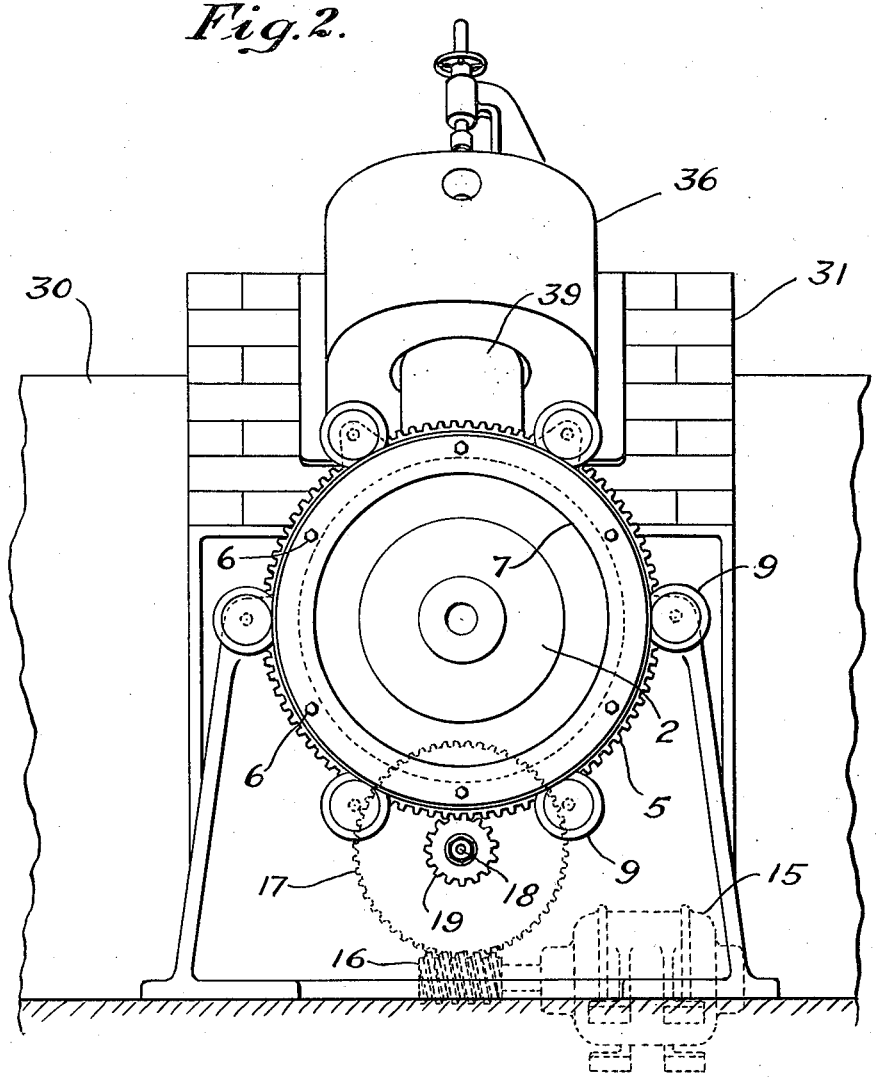

1,663,093

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

MANUFACTURE OF GLASS TUBING AND CANE.

Application filed January 3, 1927. Serial No. 158,461.

My invention relates to the automatic and continuous manufacture of glass tubing and glass cane, particularly glass tubing. Its object is to improve and render commercially practicable a system of making tubing and cane wherein a stream of molten glass is caused to flow continuously upon the inner surface of a hollow receiver which is inclined downwardly toward its smaller end and which is rotated to accumulate the glass and deliver it in the form of a continuous cylinder.

This general system of producing tubing and cane has been suggested heretofore, as in the patent to Danner No. 1,218,598, but there have been certain practical objections to this system, as stated on pages 3 and 4 of the Danner patent just mentioned, particularly the danger that bubbles of air may be entrapped in the glass when it contacts with the inner surface of the rotating cone and with the outer surface of the mandrel through which blowing air is supplied to the glass. Therefore, the rotating cone system has not been used commercially so far as I am aware. The usual method of making glass tubing and cane automatically consists in flowing the glass upon the outer surface of an inclined rotary implement which winds the glass in a tubular sheath, as set forth in the Peiler Patent No. 1,574,736, and in the Danner Patent No. 1,218,598, mentioned above.

According to my present invention, I provide a hollow and subtsantially gas-tight refractory receiver that is inclined downwardly toward its lower end and I provide arrangements for introducing into the interior of the receiver a continuous stream of molten glass which is brought to the receiver under suitable control of volume and temperature. For making tubing, a suitably regulated super-atmospheric pressure is maintained within the receiver so as to provide the necessary blowing air, without, however, requiring the use of a blow-pipe or mandrel within the receiver. The glass is conducted into the receiver in such a way as to provide a seal that prevents the escape of air through the glass inlet, and the glass is introduced under sufficient head pressure to produce the requisite flow of glass, notwithstanding the air pressure in the receiver. The provision of a substantially gas-tight rotary hollow receiver, with means for introducing glass continuously and for maintaining superatmospheric pressure in the receiver are outstanding features of novelty in the present system. Other novel and advantageous features include means for supporting, rotating and heating the cone, and means for bringing the glass to the cone in the proper quantity and in the proper consistency without interfering with the maintenance of pressure in the receiver.

In the accompanying drawing:

Figure 1 is a vertical sectional view taken longitudinally through the conical receiver of a glass-drawing system constructed in accordance with my invention; and Fig. 2 is an end view of the receiver, looking to the left and upwardly in Fig. 1 in the direction of the axis of the receiver.

In the drawing, the numeral 2 indicates a conical receiver composed of refractory glass-resistant material or lined with such material, as may be desired. The receiver 2 is inclined downwardly toward its lower end 3 and is mounted for rotation upon its longitudinal axis. For this purpose the upper end of the receiver 2 is provided with a flange 4 to which a ring gear 5 is attached by means of bolts 6 and a clamping ring 7. The ring 7 is provided with a peripheral groove 8 which engages a series of supporting rollers 9 that are carried by a plate 10 forming part of a supporting frame-work. The rollers 9 thus serve to support the receiver 2 while permitting it to rotate freely. The gear ring 5, the plate 10 and the associated metal parts are preferably made of heat-resistant metal such as "calite."

For the purpose of rotating the receiver 2, an electric motor 15 carries on its armature shaft a worm 16 meshing with a worm wheel 17 on the upper end of an inclined shaft 18, the lower end of which carries a spur pinion 19 meshing with the ring gear 5.

In order to maintain the interior of the receiver 2 substantially gas-tight, baffle-grooves 25 are provided in the surface of the ring gear 5 which rests against the stationary plate 10, and baffles 26 are provided on the adjacent surface of the plate 10 and extend into the grooves 25.

Superatmospheric pressure, properly regulated for blowing the tubing, is provided in the interior of the receiver 2 by any suitable means, indicated herein as a compressed air supply pipe 27 controlled by a valve 28.

Molten glass is brought to the receiver 2 from a melting tank 30 or other suitable source through a conduit or forehearth 31 which is preferably sealed from the firespace of the furnace 30 by a separator 32. The forehearth 31 is provided with independent temperature controlling arrangements, including burners 33 and a damper-controlled stack 34. At the front of the forehearth 31 is a feeding chamber 36, having in its bottom an opening in which is inserted the upper end of a refractory feed-tube 37. The flow of glass through the forehearth 31, and the level of the glass in the feeding chamber 36, are controlled by a vertically adjustable gate 35, beneath which the glass passes from the forehearth to the feeding chamber. By the proper adjustment of the gate 35, a sufficient head of glass is maintained in the feeding chamber to establish the proper glass pressure in the feed tube 37, so as to overcome the air pressure in the receiver 2, the feed tube being made long enough for this purpose. The volume of glass that is discharged through the feed-tube 37 is controlled by a vertically adjustable plug 38.

The feed tube 37 is provided with a flange 37$^a$ by means of which the feed tube is supported in a suitable opening formed in the metal framework. The flange 37$^a$ forms a gas-tight joint with the adjacent metal surface 38$^a$ on which it is supported, thereby preventing the escape of air from the receiver 2 around the feed tube.

A casing 39 surrounds the upper end of the feed tube 37 and provides a heating space 40. One or more burner openings 41 are provided in the casing 39, and also one or more openings 41$^a$ for discharging combustion products from the heating space 40.

The glass passes from the feeding chamber through the feed tube 37 in a continuous stream 42 which is received on the inner wall of the receiver 2 and accumulates thereon in a layer, as indicated at 43. From the lower end 3 of the receiver 2, the glass is drawn in a continuous tube 44 by any usual or desired traction means and is divided into lengths for subsequent use.

A shown in the drawing, the receiver 2 is heated by flames introduced from a burner 45 into a fire box 46 which surrounds the receiver 2 and is provided with a stack 47 controlled by a damper 48. Other means may readily be designed for keeping the receiver 2 at proper temperature.

In starting the operation of the system described above, the receiver, the feed-tube 37 and the glass in the forehearth 31 are brought to the proper temperature, the gate 35 being lowered at this time to retain the glass in the forehearth. The initial heating of the receiver 2 and the feed-tube 37 may suitably be accomplished by introducing a flame into the lower end 3 of the receiver 2, the plug 38 being raised so as to allow the flame to pass up through the feed tube into the feeding chamber 36. When proper temperature conditions are established, the gate 35 is raised, and the glass flows into the feeding chamber 36 and through the feed-tube 37 into the receiver 2. The gate 35 is used to establish an approximately correct level of glass in the feeding chamber and an accurate adjustment of the flow is secured by vertically adjusting the plug 38.

It will be noted that the feed-tube 37 is completely filled with glass, which provides a seal against the escape of air from the receiver 2 in addition to the mechanical seals provided between the gear ring 5 and the plate 10 and between the feed tube flange 37$^a$ and its support 38$^a$. Another seal is provided by forming a circular groove 49 in the upper surface of the receiver flange 4, and filling this groove with heat-resistant cement or other suitable packing.

When solid glass cane is to be manufactured, the interior of the receiver is placed in communication with the outer atmosphere through the pipe 27, and the operation otherwise takes place as described above.

It is preferred that no blow-pipe or mandrel be employed in this system, especially for making tubing, in order to reduce to a minimum the danger of entrapping air bubbles in the glass. However, if it is desired to apply a mechanical smoothing or mixing action to the interior of the glass on the walls of the receiver 2, a stationary mandrel may be provided inside of the receiver of such diameter as to engage the inner surface of the accumulated glass. Such a structure would resemble that described and claimed in the copending application of George E. Howard, filed February 8, 1927, Serial No. 166,174. Such a mandrel, if used, may be perforated so as to act as a blow-pipe to supply the blowing air to the tube, or it may be solid, as shown in the other applications identified above.

While I prefer that the receiver be conical, or at least tapered toward its discharge end, it is also possible to make the inside of the receiver cylindrical, and the principles of my invention may be carried out with such a cylindrical receiver.

The use of a hollow receiver for accumulating and winding molten glass into tubular form, without the presence of a forming mandrel or other internal obstruction, not only has the advantage of minimizing the entrapping of air bubbles in the glass, but also has the still greater advantage of facilitating the union of the glass convolutions into a homogeneous layer, because all parts of the glass accumulated around the interior of the receiver are able to exchange heat freely by radiation across the interior of the receiver. When glass is accumulated upon a rotating mandrel, or in a receiver containing a mandrel, the exchange of heat between portions of the glass on opposite sides of the accumulated layer is obstructed, and hence, if the glass is at all irregular or "spotty" in consistency, a non-homogeneous condition results and tends to persist in the finished product.

The structure shown herein may be modified in many respects without departing from my invention as set forth in the appended claims.

I claim as my invention:

1. The method of drawing glass continuously in tubular form that comprises flowing a stream of molten glass upon the inner surface of a tapered receiver having substantially its entire interior unobstructed, maintaining superatmospheric pressure within said receiver, rotating said receiver to wind a layer of glass upon the said inner surface of said receiver, and withdrawing the glass from the smaller end of said receiver.

2. The method of drawing glass continuously in tubular form that comprises flowing a stream of molten glass upon the inner surface of a tapered receiver that is inclined downwardly toward its smaller end, maintaining superatmospheric pressure within said receiver, rotating said receiver to wind a layer of glass upon the said inner surface of said receiver while keeping the interior of said glass layer free from contact with any forming member, and withdrawing the glass from the smaller end of said receiver.

3. The method of drawing glass continuously in cylindrical form that comprises flowing a stream of molten glass from the submerged outlet of a glass container through an air-tight passage onto the inner surface of a tapered receiver, rotating said receiver to accumulate a layer of the glass around said receiver, and withdrawing the glass from the smaller end of said receiver.

4. The method of drawing glass continuously in tubular form that comprises flowing a stream of molten glass upon the inner surface of a tapered receiver, rotating said receiver to accumulate a layer of the glass around said receiver, maintaining superatmospheric pressure within said receiver, and withdrawing the glass from the smaller end of said receiver without engaging the interior of the glass in said receiver with any forming implement.

5. In apparatus for continuously drawing glass in cylindrical form, the combination of a tapered rotary receiver having its interior unobstructed by any glass forming implement, and means for flowing a stream of molten glass upon the inner surface of said receiver, the stream of glass cooperating with said last named means to form a seal against the passage of air outwardly from said receiver.

6. In apparatus for continuously drawing glass in tubular form, the combination of a tapered rotary receiver having its interior unobstructed by any glass-forming implement, means for flowing a stream of molten glass upon the inner surface of said receiver, and means for maintaining superatmospheric pressure within said receiver.

7. In apparatus for continuously drawing glass in tubular form, the combination of a conical rotary unobstructed receiver inclined downwardly toward its smaller end, means for introducing a stream of molten glass into said receiver while said receiver is rotating, and means for maintaining superatmospheric pressure within said receiver.

8. In apparatus for continuously drawing glass in tubular form, the combination of a conical receiver inclined downwardly toward its smaller end, means for rotating said receiver around its longitudinal axis, a cover for the upper and larger end of said receiver, means having a fluid-tight connection with said cover for introducing a stream of molten glass into said receiver, and means for introducing compressed air through said cover into said receiver.

9. Apparatus for continuously drawing glass in tubular form, comprising a rotary conical receiver, means for introducing compressed air into said receiver, means for introducing a stream of molten glass into said receiver, and means for preventing escape of air from said receiver, between said air supply and glass supply means and the wall of said receiver.

10. Apparatus for continuously drawing glass in tubular form, comprising a rotary conical receiver, means for introducing compressed air into said receiver, and means for conducting a stream of molten glass into said receiver so as to prevent escape of air from said receiver through the glass inlet.

11. Apparatus for continuously drawing glass in tubular form, comprising a rotary conical receiver, means for introducing compressed air into said receiver, means for conducting a stream of molten glass into said receiver so as to prevent escape of air from said receiver through the glass inlet, and means for preventing escape of air from said receiver around the glass inlet.

12. Apparatus for continuously drawing glass in tubular form, comprising a conduit for supplying molten glass, a feed chamber arranged to receive molten glass from said conduit, means for regulating the flow of glass from said conduit into said feed chamber and for maintaining a definite glass level in said chamber, a feed tube arranged to conduct glass from said feed chamber, and a rotary tapered receiver having an air-tight connection with said feed tube and arranged to receive and wind on its inner surface a stream of glass from said feed tube.

13. Apparatus for continuously drawing glass in tubular form, comprising a conduit for supplying molten glass, a feed chamber arranged to receive molten glass from said conduit, means for regulating the flow of glass from said conduit into said feed chamber and for maintaining a definite glass level in said chamber, a feed tube arranged to conduct glass from said feed chamber, a rotary tapered receiver arranged to receive and wind on its inner surface a stream of glass from said feed tube, and means for introducing compressed air into said receiver, the head of glass in said feed chamber and said feed tube being sufficient to prevent escape of air from said receiver through said feed tube.

14. Apparatus for continuously drawing glass in tubular form, including a conical receiver inclined downwardly toward its smaller end, a ring gear secured to the upper and larger end of said receiver, driving means for rotating said gear and said receiver, means for rotatably supporting said receiver and said gear, a stationary closure member at the upper end of said receiver, means for introducing a stream of molten glass at a controllable rate into the interior of said receiver, and means for introducing compressed air through said closure member into the interior of said receiver.

15. Apparatus for continuously drawing glass in tubular form, comprising a conical receiver inclined downwardly toward its smaller end and having a flange at its larger upper end, a gear ring and an annularly grooved bearing member clamped to opposite sides of said flange, rollers engaging the groove of said bearing member for rotatably supporting said receiver, means for driving said gear ring, a stationary closure member adjacent to said gear ring, means for introducing compressed air into said receiver through said closure member, means for preventing escape of air between said gear ring and said closure member, and means for introducing a stream of molten glass into said receiver.

16. Apparatus for continuously drawing glass in tubular form, comprising a conical receiver inclined downwardly toward its smaller end and having a flange at its larger upper end, a gear ring and an annularly grooved bearing member clamped to opposite sides of said flange, rollers engaging the groove of said bearing member for rotatably supporting said receiver, means for driving said gear ring, a stationary closure member adjacent to said gear ring, means for introducing compressed air into said receiver through said closure member, means for preventing escape of air between said gear ring and said closure member, means for introducing a stream of molten glass into said receiver, comprising a feed tube extending through an opening in said closure member and having an external flange for supporting said feed tube and for preventing escape of air from said receiver around said feed tube, and means for supplying a regulated quantity of molten glass to said feed tube.

17. The method of drawing glass continuously in tubular form that comprises flowing a stream of molten glass upon the inner surface of an inclined hollow receiver having its interior completely unobstructed, maintaining superatmospheric pressure within said receiver, rotating said receiver to wind a layer of glass upon the said inner surface of said receiver, and withdrawing the glass from the lower end of said receiver.

18. The method of drawing glass continuously in cylindrical form that comprises flowing a stream of molten glass to the interior of an inclined hollow receiver through a confining passage, sealing the passage by the stream against the flow of air outwardly from the receiver, flowing the stream upon the inner surface of said receiver, rotating said receiver to accumulate a layer of glass around the interior of said receiver, and withdrawing the glass from the lower end of said receiver.

19. In apparatus for continuously drawing glass in tubular form, the combination of an inclined hollow receiver having its interior unobstructed by any glass-forming implement, means for flowing a stream of molten glass upon the inner surface of said receiver, and means for maintaining superatmospheric pressure within said receiver.

20. Apparatus for continuously drawing glass tubing or cane, comprising a container for molten glass having a discharge outlet submerged in the glass, a rotating hollow receiver spaced below said outlet, and means providing an air-tight glass conducting conduit between one end of said receiver and said submerged outlet.

21. Apparatus for continuously drawing glass tubing or cane comprising a container for molten glass having a discharge outlet submerged in the glass, a rotating conical receiver spaced below said outlet and inclined downwardly toward its smaller end, and means providing an air-tight glass conducting conduit between the larger upper end of said receiver and said discharge outlet.

22. Apparatus for continuously drawing glass tubing comprising a container for molten glass, a rotating conical receiver spaced below said outlet and inclined downwardly toward its smaller end, means providing an air-tight glass conducting conduit between the larger upper end of said receiver and said discharge outlet, the rotation of said receiver causing the glass received therein to be wound on the inner surface of the receiver in a continuous layer, and means for introducing compressed air into the interior of said layer of glass.

Signed at Hartford, Conn., this 30th day of December, 1926.

KARL E. PEILER.